United States Patent [19]

Patzschke et al.

[11] 4,373,072

[45] Feb. 8, 1983

[54] SELF-CROSS-LINKING, THERMOSETTING, AQUEOUS LACQUER COATING MATERIAL, AND ITS UTILIZATION FOR THE CATHODIC DEPOSITION UPON ELECTRICALLY CONDUCTING SURFACES

[75] Inventors: Hans-Peter Patzschke; Armin Göbel, both of Wuppertal, Fed. Rep. of Germany

[73] Assignee: Herberts Gesellschaft mit beschränkter Haftung, Wuppertal, Fed. Rep. of Germany

[21] Appl. No.: 183,041

[22] Filed: Sep. 2, 1980

[30] Foreign Application Priority Data

Sep. 8, 1979 [DE] Fed. Rep. of Germany ....... 2936411

[51] Int. Cl.$^3$ .............................................. C08L 67/04
[52] U.S. Cl. .................................... 525/438; 525/424; 525/127; 525/440; 525/450; 525/454; 525/528; 525/533
[58] Field of Search ............... 525/528, 450, 438, 440, 525/454; 528/83, 84, 110, 112, 121, 123; 204/181 C

[56] References Cited

U.S. PATENT DOCUMENTS

| | | | |
|---|---|---|---|
| 3,484,408 | 12/1969 | Holm | 528/361 |
| 3,658,761 | 4/1972 | Hostettler et al. | 528/361 |
| 3,793,417 | 2/1974 | Erikson et al. | 528/84 |
| 4,037,018 | 7/1977 | McGinniss | 260/29.2 EP |

*Primary Examiner*—Theodore E. Pertilla
*Attorney, Agent, or Firm*—Mandeville and Schweitzer

[57] ABSTRACT

The invention relates to a self-cross-linking, thermosetting, aqueous lacquer coating material, which comprises synthetic resins having a mean molecular weight ($\overline{M}_n$) of about 500 to 15,000 and containing primary and/or secondary—and if appropriate also tertiary—amino groups as well as terminal esterified carboxyl groups, having an amine number of about 20 to 180 and an ester number of about 20 to 350, and which becomes dilutable with water through protonization with acids.

The invention moreover concerns the utilization of this lacquer coating material for the purposes of cathodic deposition upon electrically conducting surfaces.

15 Claims, No Drawings

SELF-CROSS-LINKING, THERMOSETTING, AQUEOUS LACQUER COATING MATERIAL, AND ITS UTILIZATION FOR THE CATHODIC DEPOSITION UPON ELECTRICALLY CONDUCTING SURFACES

The present invention relates to a self-cross-linking, thermosetting, aqueous lacquer coating material, and the application thereof for cathodic deposition upon electrically conducting surfaces.

In European patent application No. 79100735.4, there are described cathodically depositable electro-dipping lacquer binders, which eliminate alcohols and form amides during the baking process. The coating agent described in this patent application contains, as the binding medium, one or several amino-group-containing resin(s) (Component A), which contain(s) primary and-/or secondary—and if appropriate also tertiary—amino groups as well as amide-convertible crosslinking agents (Component B). It has been observed that under certain circumstances precipitation phenomena and/or phase separations may occur upon prolonged standing of the electro-dipping varnish bath which contains such binding agents. This unfavourable effect may be diminished, or may in many cases even be prevented, if the cross-linking agent (Component B) also contains amino groups within the molecule, as has already been described in the above-mentioned patent application.

From DE-OS Nos. 22 52 526 and 22 65 195 there are known processes for electrical coating at the cathode, in which the aqueous neutralized solutions contain a self-curing, organic synthetic resin which also contains—apart from amino—and hydroxyl-groups—isocyanate groups that are stable at room temperature and are capable of reacting with hydroxyl groups at elevated temperatures to form urethane bondings. The disadvantage of this process lies in the pollution of the exhaust air by large quantities (10 to 20% by weight) of eliminated protective groups such as alcohols, amino-alcohols and phenols.

An object of the present invention is the creation of an aqueous self-cross-linking electro-dip coating material which procures an improvement with respect to the above-mentioned disadvantages. A further object of the invention is the provision of a lacquer coating medium which may be applied by the conventional processes for lacquer application, which furnishes lacquer coatings affording good anti-corrosion protection and which releases the least possible quantity of organic solvents and of decomposition products to the environment during the baking operation.

According to the present invention, the above-mentioned disadvantages are diminished by means of self-cross-linking binding agents which contain, as functional groups in the resin-molecule, primary and/or secondary amino groups in addition to ester groups that are capable of amidation-interchange.

Accordingly the present invention provides a self-cross-linking, thermosetting aqueous lacquer coating agent, containing a binding agent which is rendered water-dilutable by protonization with acids, pigments, fillers, anti-corrosion inhibitors, lacquer adjuvants, catalysts if appropriate, and organic solvents in quantity of up to 20% by weight referred to the total weight of the coating agent; characterized in that the binding agent comprises a synthetic resin containing primary and/or secondary—and if appropriate also tertiary—amino groups as well as terminal esterified carboxyl groups, the synthetic resin having a mean molecular weight ($\overline{M}_n$) of about 500 to 15000 and showing an amine number of about 20 to 180 and an ester number of 20 to 350, where the ester groups are largely stable in a neutral aqueous medium yet are reactive toward primary and-/or secondary amino groups of the synthetic resin in a basic medium at temperatures above about 140° C. By 'terminal carboxyl groups' are meant those carboxyl groups which are present at the end of a chain, or at the ends of side-chains in branched-chain molecules.

Moreover, a preferred object of the invention is the utilization of this coating agent for cathodic deposition from a lacquer bath upon electrically conducting surfaces.

The binding agent according to the invention is preferably a reaction product of epoxide-group-containing and/or isocyanate-group-containing compounds with hydroxy- or amino-group-containing aldimines or ketimines and with hydroxy- and/or aminoalkyl esters or acidic polycarboxylic acid esters and, if appropriate, polyesters. Whether mixtures of the starting materials may be utilized, and the sequence in which the reactions are carried out, depends upon the type of starting materials used and upon the reactive groups in each case. This will be further elucidated in detail in the following specification with reference to specific starting products. It is also possible to use individual starting products to prepare intermediate products, and then to link these to the molecules of the binding agent with the other starting products or with intermediate products which had been obtained from other starting products.

Conveniently at least 80, preferably at least 90 and most particularly at least 95% equivalent of the terminal carboxyl groups are esterified. It is especially advantageous that substantially all the terminal carboxyl groups be esterified.

The reactivity must be so adjusted that the resins are stable in neutral aqueous solution and that after coating they become cross-linked in the basic medium at elevated temperatures. At such temperatures decomposition products are usually formed in quantities of below about 10% by weight, frequently below 8% by weight and most commonly below 6% by weight. The resin solutions no longer show any precipitation phenomena, and they may be run stably with a higher pH-value notwithstanding the lowering of the degree of neutralization.

Due to the gentle reaction conditions and the slight degree of 'yellowing' associated therewith, the resin according to the invention arises in the simplest case through direct addition of hydroxy- and/or amino-carboxylic acid esters and/or acidic polycarboxylic acid esters and of amino-group-containing and/or hydroxyl-group containing ketimines and/or aldimines to resin molecules having isocyanate groups or epoxide groups. The order of the individual reaction steps for introduction of the reactive groups is deduced from the practically feasible synthetic stages. All that is important from the point of view of the invention is the simultaneous side-by-side existence of reactive amino groups and ester groups capable of amide interchange in one resin.

For attainment of water-solubility, an amine number of from 20 to 180, preferably 30 to 150 and most preferably 50 to 120 is required. It may also be procured by mixing of two suitable resins, one having a high amine number and the other a lower one. The proportion of primary and secondary amino groups should be at least around one-third of the total amine number, i.e. the reactive amine number should be above 30 and preferably above 50. What is necessary is to keep the proportion of secondary and/or especially advantageous primary amino groups present in the molecule as high as possible. The amines utilized for preparation of the resins have a $pK_b$-value of 2.5 to 9.0, preferably of 2.8 to 7.0 and most preferably between 3.0 and 5.5.

The resins according to the invention are so composed that for every primary or secondary amino group there is present in the molecule from about 0.1 to 5 but preferably from 0.5 to 1.2 'Val' of ester groups. A stoichiometric equivalence relationship is aimed at. Expressed in another way, the equivalence ratio as between primary and/or secondary amino groups and esterified carboxyl groups is from 1:5 to 1:01 and most preferably from 1:1 to 1:0.5. The number of amide-interchangeable ester groups preferably corresponds to an ester number of from 20 to 350, in particular from 40 to 250 and with particular advantage from 60 to 150. The mean molecular weight ($\overline{M}_n$) of the self-cross-linking resins may be from 500 to 15,000 but preferably is about 800 to 10,000. The viscosity, measured at 25° C., lies approximately between 0.5 and 10 Pa s, and is preferably from 1 to about 5 Pa s, after dilution with monobutyl glycol ether to a concentration of 50% by weight. The desired molecular weight and viscosity may also be procured by mixing of two suitable resins having high and low molecular weight and high and low viscosity, respectively.

As parent substances for the resins there may be used, for example, aliphatic, cycloaliphatic and/or aromatic hydrocarbon skeleton structures which contain more than one and preferably at least two epoxide- or isocyanate-group(s) in the molecule. The 1,2-epoxide-group-containing resins prove to be particularly suitable; they are prepared by (a) introduction of glycidyl groups in an alkaline medium using, for example epichlorhydrin
 (aa) into OH-functional resins+ producing polyglycidyl esters,
 (ab) into COOH-functional resins producing polyglycidyl esters, or
 (ac) into NH₂-functional resins producing polyglycidyl amines;
(b) internal polymerization of glycidyl (meth)acrylate with a suitable monomer mixture of e.g. styrene and/or (meth)acrylic acid esters having various chain lengths and/or hydroxyalkyl(meth)acrylates.

+such as Epoxy-Novolacs (registered trademark)

It is particularly preferable with respect to (a) that the 1,2-epoxide-group-containing resins shall be polyglycidyl esters of the general formula

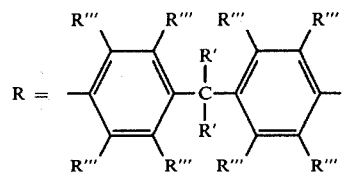

R' = hydrogen or —$C_nH_{2n+1}$
R" = —$(CR'_2)_n$—
R'" = R' or halogen, preferably hydrogen
m = 0 to 3
n = 1 to 3 with a mean molecular weight ($\overline{M}_n$) of about 300 to 2,000 and with an epoxy-equivalent-weight of about 170 to 1,500. Such resins are e.g. reaction products of epichlorhydrin with dioxydiphenylmethane (bis-phenol F) or with dioxydiphenylpropane (bis-phenol A), and they may also be used in the hydrogenated form.

In order to diminish the functionality, or to lengthen the chain and thus to raise the molecular weight, the preferred polyglycidyl ethers may be reacted with compounds that contain reactive hydrogen. Such compounds possess, for example, carboxyl groups, hydroxyl groups or primary and secondary amino groups. Preferred chain-limiting agents are dimethylpropionic acid, iso-palmitic acid, versatic acid, diethylamine, di-(2-ethylhexyl)amine, diethanolamne and/or linear, branched, saturated or unsaturated mono-alcohols of various chain lengths. Preferred chain-lengthening agents are organic polyalcohols such as 1,6-hexanediol or dioxydiphenylpropane, especially polymeric polyols such as polyoxyalkylene glycols or polyether polyols and/or diamines with secondary amino groups such as the reaction product of 1,6-hexanediamine with two mole of glycidyl ether or of the glycidyl esters of α-branched fatty acids.

Epoxidized polyglycidyl ethers may also contain other fundamental components, such as triglycidyl isocyanurate, heterocyclic diglycidyl compounds (DE-OS No. 18 16 095), substituted hydantoins (U.S. Pat. No. 3,391,097), dicyclopentadiene diepoxide or 1-epoxyethyl-3,4-epoxy-cyclohexane.

Co-polymerization of glycidyl-(meth)acrylate with other unsaturated monomers procures the preparation of epoxy-group-containing resins having a mean molecular weight ($\overline{M}_n$) of from about 500 to 10,000 but particularly from at about 800 to 6,000 and having an epoxy-equivalent-weight of from 300 to 6,000 especially from 800 to 4,000. Unsaturated monomers are styrene, vinyl toluene, α-methyl styrene and/or (meth)acrylic acid esters of various chain lengths, where the (meth)acrylic

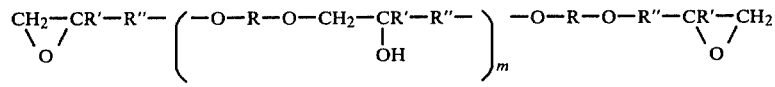

acid esters preferably contain linear or branched aliphatic $C_1$ to $C_4$-alcohols and the acrylic acid esters preferably contain linear or branched aliphatic, cycloaliphatic or aromatic $C_1$ to $C_8$-alcohols. If appropriate, hydroxy-group-containing monomers such as hydroxyalkyl(meth)acrylic acid esters, e.g. 2-hydroxypropyl methacrylate, 1,4-butanediol mono-acrylate or hydroxyethyl acrylate, or etherified methylol derivatives of (meth)acrylamide, may be used as additional compowherein nents. The interpolymerization takes place in organic solvents such as alcohols or glycol ethers at about 60° to 145° C., with addition of radical initiators such as peroxides, hydroperoxides, per-esters or thermally decomposable azo-compounds.

Isocyanate-group-containing polymers which are suitable for the composition of the base-resin consist of aromatic, aliphatic and/or cycloaliphatic fundamental skeleton structures with at least two isocyanate groups per molecule. Typical examples are the isomers, or mixtures of isomers, of toluene di-isocyanate, 4,4-diphenylmethane-di-isocyanate, and also hydrogenation products of these such as dicyclohexylmethane-di-isocyanate. Also applicable are hexane-1,6-di-isocyanate, 1,6-di-isocyanato-2,2,4-trimethyl hexane and 1-isocyanato-methyl-3-isocyanato-1,5,5-trimethyl cyclohexane. Particular preference is given in this context to higher-functional polyisocyanates, which arise through trimerization, decomposition with water, and reaction with polyalcohols such as trimethylol propane, triethyl isocyanurate or amino-group-containing polyols. Products of that kind are offered commercially, e.g. triphenylmethane-4,4',4''-tri-isocyanate (Desmodur R), the biuret from hexamethylene di-isocyanate and water (Desmodur N) or the adduct from toluene di-isocyanate and trimethylol propane (Desmodur L).

Chain limiting or chain-lengthening may here also be accomplished depending on the functionality in each case—by reaction with compounds that contain reactive hydrogen, whereupon amide-, urethane- or urea linkages arise. Examples of such compounds are dodecyl alcohol, dimethyl-aminoethanol, di-(2-ethylhexyl)amine, 1,6-hexanediol, N-methyl diethanolamine or the reaction product of 1,6-hexamethylediamine with 2 mol of glycidyl ether or glycidyl ester(s) of α-branched fatty acids.

Suitable isocyanate-containing pre-polymers are prepared by reaction of polyglycol ethers, polyesterpolyols, polyether polyols, polycaprolactone polyols, polycaprolactam polyols or polyaminoamides with excess of polyisocyanates at temperatures of about 10° to 100° C., possible with addition of catalysts such as dibutyl-tin dilaurate or tertiary amines. Thus, for example, hydroxyl-group-containing polyesters are first prepared by esterification of polyvalent—preferably bivalent and, if appropriate, additionally trivalent—alcohols with polyvalent (preferably bivalent) aliphatic, cycloaliphatic, aromatic and/or heterocyclic carboxylic acids. An appropriate OH-group-containing polyester may also be prepared by reaction of polyglycidyl ethers with linear or branched aliphatic or cyclic, saturated or unsaturated $C_1$ to $C_{18}$ monocarboxylic acids or with linear or branched aliphatic or cyclic, saturated or unsaturated monoamines. The choice of polyalcohols and of carboxylic acids is made from the point of view of the greatest possible saponification stability of the ester groups. Hydroxyl-group-containing polymers which in addition contain urethane-, urea-, biuret- or allophanate-groups may also be utilized. The OH-group-containing base-resins are then converted with polyisocyanates in a second reaction stage to yield an NCO-pre-polymer. This preparation is carried out at around 25° to 150° C., preferably at 50° to 100° C., in the presence of organic solvents such as methyl ethyl ketone or acetic acid ethyl ester.

The ester- and amino-groups are reacted directly with the base-resins containing epoxide- or isocyanate-groups. Thus the introduction of the amino group occurs by reaction with amino-group-containing or hydroxyl-group-containing ketimines and/or aldimines. The primary amino groups are so protected by ketimine and/or aldimine formation that they may without much difficulty be introduced, by way of a further functional group, into the base-resin molecule. The protective group is readily split off again upon solution in water.

The definition 'primary amino groups' of the binding agent shall be understood so as to include also those amino groups which are protected by ketimine—or aldimine-groups. The reaction conditions (temperature, choice of solvent, working under anhydrous conditions) are so selected that no hydrolytic decomposition of the C=N double bond occurs. The preferential reaction of amino-group-containing ketimine with epoxide- or isocyanate-groups already commences at room temperature. To procure complete conversion it is as a rule necessary to raise the temperature to 50°–120° C. toward the end of the reaction. In the preparation of products with low viscosities it is often useful to pre-prepare the ketimine solution and to add the base-resin slowly. The choice of molar ratios of the components used must be such as will ensure that no unreacted low-molecular-weight amine remains over in the reaction batch, because otherwise puncture-like surface defect phenomena will occur during the electrophoretic coating process. The ketimines and/or aldimines are obtained, according to well known procedures, by elimination of water between the appropriate polyamines of the general structure $R=NH-R-NH_2$ or the appropriate aminoalcohols of general structure $HO-R-NH_2$ and suitable linear or branched-chain aliphatic or cyclic ketones or aldehydes. The amines used for preference are diethylene triamine, N-methyl ethylenediamine, N-methyl propylenediamine, N-aminoethyl piperazine; 2-aminoethanol is preferred among the alcohols. Diethyl ketone, methyl isobutyl ketone, ethyl n-propyl ketone or even cyclopentanone, cyclohexanone, acetophenone or isobutyraldehyde are preferentially utilized for screening of the amino group. Most suitable are those ketones that facilitate removal from the system of the water of reaction, and the substituents of which effect the least possible steric hindrance. Completion of the ketimine reaction is achieved by providing excess of ketone.

Introduction of the carboxylic acid ester groups into the epoxide- or isocyanate-containing base-resin is accomplished by reaction of hydroxy- and/or aminoalkyl carboxylic acid esters and/or acidic polycarboxylic acid esters with resin molecules containing isocyanate- and epoxide-groups. They must react with the primary or secondary amino groups in the neutral aqueous medium of the deposited film at temperatures above about 140° C. and particularly above 160° C. The carboxyl group may be esterified with short-chain and/or long-chain linear and/or branched and/or cyclic $C_1$ to $C_{18}$ (preferably $C_1$ to $C_6$) monoalcohols. The volatility of the eliminated alcohol should be high enough that is removed from the film at the baking temperatures to be used in thin layers. Substantially, all terminal carboxyl groups should be esterified with alcohols which have boiling point below 280° C., preferably below 180° C. and most preferably below 140° C. In order to achieve a good flow characteristic it is necessary to have a proportion of thermally cleavable high-boiling alcohols in the film. On the other hand, the reactivity of the esters is enhanced by the use of low-boiling primary alcohols such as methanol or ethanol, and by increasing the electrophilic activity of the carboxyl group through suitable substituents. The number of amide-interchangeable ester group preferably corresponds to an ester number of from 40 to 150 and particularly from 60 to 120.

The ester number defines the quantity, in mg of KOH, that is equivalent to the quantity of alcohol which is contained in 1 g of solid substance and which can be eliminated by amide exchange during the thermal cross-linking process.

A direct conversion may be accomplished by reaction of the aminoalkylcarboxylic acid esters which contain a reactive secondary or primary amino group with epoxide base-resins, whereupon a basic functional group becomes introduced simultaneously. When an isocyanate resin is used, however, then this amino group becomes converted into a neutral urea grouping; this is the preferred process. An especially simple, direct conversion reaction is possible between hydroxycarboxylic acid alkyl esters and polyisocyanates. Incorporation of methyl- and/or ethyl- and/or propyl-ester(s) of lactic acid or of dimethylol propionic acid has proved to be particularly satisfactory.

Acidic polycarboxylic acid alkyl esters are also suitable for introduction of carboxylic acid alkyl esters. Thus, for example, dicarboxylic acid monoalkyl esters may be reacted with epoxide-group-containing resins which should contain at least two, and preferably more than two, epoxide groups in the molecule. The monoesters are prepared from saturated or unsaturated dicarboxylic acid anhydrides, such as maleic anhydride or succinic anhydride or tetrahydrophthalic anhydride, and $C_1$ to $C_6$ straight-chain or branched-chain saturated or unsaturated mono-alcohols, preferably methanol and/or ethanol. A slight excess of the alcohol used increases the stability of the monoester. The reaction temperature should if possible be kept below 120° C., preferably below 100° C., during the preparation as well as during the addition to the epoxide resin, in order to avoid occurrence of ester-interchanges. If tri- to hexacarboxylic acid anhydrides, such as trimellitic acid anhydride or pyromellitic acid di-anhydride, are reacted with hydroxyalkyl carboxylic acid esters, then either all of the carboxyl groups become esterified or else the number of functional carboxyl groups is reduced to about one per molecule through reaction with mono-epoxide compounds. Incorporation into the base-resin is then carried out either by amide-interchange or by reaction with NH- or OH-groups or by an addition reaction to isocyanate groups or, in particular, epoxide groups. Polyesters containing carboxylic acid alkyl ester groups may also be obtained by reactions of acidic polycarboxylic acid esters with mono-epoxide compounds or, if appropriate, with polyalcohols, in which case the condensation is carried on until an acid number below 10, preferably an acid number below 5, is attained. The reactions take place at reaction temperatures of about 140° to 240° C., preferably of between 160° and 210° C.; they are best carried out by stages, where the quantity of hydroxyethyl carboxylic acid ester is approximately 1.0 to 1.3 mol referring to the anhydride group. Examples of polycarboxylic acid anhydrides are trimellitic acid anhydride, pyromellitic acid anhydride, or corresponding hydrogenated ring systems such as cyclopentane tetracarboxylic acid anhydride, pyrazine tetracarboxylic acid anhydride or even butane tetracarboxylic acid anhydride.

Compounds that are regarded as mono-epoxide compounds are monoalkyl glycidyl ethers such as for example butylglycidyl ether, or monoglycidyl esters such as the glycidyl ester of versatic acid. Appropriate monofunctional components may also be prepared by the defunctionalization of polyglycidyl ethers based upon bis-phenol A or of epoxidized olefines such as e.g. 1-epoxyethyl-3,4-epoxycyclohexane or dicyclopentenyl di-epoxide, with monoamines or alcohols or organic acids.

However, the introduction of the ester- and amino-groups may also be accomplished indirectly through the preparation of an epoxide- or isocyanate-group-containing intermediate product. Here the process is, for example, that suitable isocyanate-group-containing resins are so extensively defunctionalized by reaction with amino-group-containing ketimines or with hydroxy- and/or amino-alkyl carboxylic acid esters that there remains only one isocyanate group per molecule. The intermediate product may then be introduced into the hydroxyl-group-containing base-resin by way of that isocyanate group, where either the intermediate product may contain both of the functional groups to be introduced or else the intermediate product may be a mixture of two intermediate products with different functional groups. It is, however, also possible to proceed by stages, firstly introducing the one functional group into the base-resin and then introducing the other functional group by way of the intermediate product. If an OH-group-containing resin is prepared from polyglycidyl ether and acidic polycarboxylic acid esters, then the amino group is introduced via an appropriate mono-isocyanate. If, conversely, the epoxide resin first reacts with the amino-group-containing ketimine, then the resultant OH-group-containing resin must be reacted with an isocyanate-group-containing urethane ester, which is for example prepared from 1 mol of hexamethylene di-isocyanate and 1 mol of lactic acid ethyl ester.

If, on the other hand, a hydroxyl-group-containing polyester produced from dicarboxylic acid anhydrides and polyalcohols, with an acid number below 10 and in particular below 5, is used to procure expansion of the molecule, then the primary amino group as well as the carboxylic acid ester group must be introduced via an isocyanate-group-containing intermediate product.

The same considerations apply if the epoxide-group-containing intermediate product has been prepared from resin containing at least two epoxide groups, e.g. from a polyglycidyl ether based upon bis-phenol A with an epoxy-equivalent-weight of 180 and an amino-group-containing ketimine.

A special case is the utilization of ester-group-containing di-isocyanates such as 2,6-di-isocyanato-methyl caproate (lysin di-isocyanate methyl ester).

In order to suitably adjust the mechanical and electrical properties, it is possible to mix or to co-condense several self-cross-linking types of resin, as long as they are compatible. However, other amino-group-containing resins, such as polyaminoamide resins, may be mixed in as well. It is further possible to emulsify or to co-condense small amounts of other modifying resins into the cathodically depositable binding agents. As such modifying resins there may be utilized maleinate resins, styrene/allyl alcohol co-polymers, OH-group-containing Epikote ester(s), blocked isocyanates, amine- and phenol-formaldehyde resins, and also cross-linking agents with a mean molecular weight ($\overline{M}_n$) of 500 to 5,000 which contain terminal carboxyl groups of which such proportion is esterified with mono-alcohols containing 1 to 6 C-atoms that the cross-linking agents do not migrate to the anode during the deposition process and that they show an ester number of 30 to 350 and preferably of between 100 and 250, the ester groups being largely stable in a neutral aqueous medium yet being reactive toward secondary and/or primary amino groups of the synthetic-resin binding agent in a basic medium at temperatures above about 160° C., and the cross-linking agents being such as are described as cross-linking component(s) B in EP Pat. No. 79 100 735.4. In order to avoid precipitation phenomena, the quantity emulsified should not exceed 20% by weight and should preferably be below 10% by weight-, and to improve the emulsifiability there should be present either a higher OH-number of about 100 to 250 or else a lesser proportion of basic amino groups (amine number below about 60, preferably below 40).

Solubility in water is achieved through salt-formation of the amino-group-containing resins with acidic compounds. Suitable for the purpose are, for example, hydrochloric acid, acetic acid, phosphoric acid, lactic acid, malonic acid, citric acid, formic acid, acrylic acid etc. Water-dilutable cationic resins to serve as binding agents may be prepared by adding to the basic resin approximately 0.2 to 1.0 'Val,' preferably 0.3 to 0.8 'Val,' referring to the basic nitrogen atom in the resin, of the protonating acid and stirring the mixture well at temperatures of about 20° to 90° C. Interfering solvents entrained by the preparation of the resins are distilled off in vacuo, preferably following the hydrolytic decomposition of the ketimine. The coating medium may contain up to about 20% by weight of organic solvents in order to reduce the viscosity, to control the deposition voltage and to improve the flow characteristic. Water-soluble solvents such as alcohols, glycol ether(s), keto-alcohols, or small proportions of water-insoluble solvents such as hydrocarbons of various chain lengths, may here by utilized. It is desirable to aim at an as low as possible content of organic solvents.

The solids content of the lacquer, in which the coating medium according to the invention is contained in diluted form, is governed by the method of application in each case. Solids contents of about 30 to 60% by weight are useful for dipping without application of an electrical voltage or for spraying. For cathodic deposition from a lacquer bath on to electrically conducting surfaces the solids content is usefully 5 to 30% by weight, preferably 10 to 20% by weight, after dilution with water. The pH-value of the lacquer lies in general between about 5.0 to 7.5, preferably between 6.0 to 7.0. Electrophoretic deposition is conveniently carried out not earlier than 24 hour after preparation of the bath; it is useful to stir continuously during that time in order to achieve a uniform distribution. Electrically conducting non-corrodible electrodes, e.g. of stainless steel or graphite, are used as anode(s). The article to be cathodically coated and the anode are immersed in an aqueous bath, in the manner well known for electrophoretic deposition. During the deposition process the bath is conveniently maintained at temperatures of about 20° to 30° C. Solids content, deposition temperature and deposition time, as well as the voltage, are so selected that—after rinsing-down and baking—the desired film thickness is obtained.

Curing is accomplished by baking for 15 minutes to 1 hour at about 140° to 210° C., preferably at 160° to 180° C. The baking temperature may be lowered or the completion of the reaction may be hastened by incorporation of e.g. 0.05 to 3% by weight of ester-exchange catalysts. Typical catalysts that may be used are ammonium compounds such as benzyl trimethylammonium hydroxide, organic tin compounds like dibutyl-tin dilaurate, titanium complexes such as butyl titanate, or triethanolamine titanate, or triethanolamine titanate, iron (III) acetylacetonate, chromium (III) acetylacetonate, zinc acetate, lead octoate, cerium (III) acetate, antimony trioxide or cobalt naphthenate.

The concentrated coating material which is to be diluted with water according to the invention and has a solids content of about 85 to 50% by weight, may be pigmented in the usual manner by means of a ball mill, three-roller mill or sand-mill. For pigmentation there may be used the customary pigments, fillers, corrosion inhibitors and lacquer adjuvants such as anti-foaming agents, as long as these do not enter into any undesirable reactions with water at an acidic to neutral pH-value nor introduce any water-soluble foreign ions nor precipitate during ageing in a form that cannot be redissolved by stirring. The lacquers are especially suitable for the electro-dip lacquering of metals, and after baking for 30 minute at 180° C. they furnish smooth, brilliant and hard films having good adhesion and elasticity as well as especially high corrosion-resistance. The pigment/binding agent ratio depends upon the viscosity of the binding agent; in general it lies between 0.1:1 and 1.2:1.

EXAMPLE 1

(a) Isocyanate-containing urethane ester

Into a solution of 840 g of hexamethylene-1,6-diisocyanate in 159 g of dry methyl isobutyl ketone is added, at about 40° C. during 3 hours, a mixture of 590 g of anhydrous lactic acid ethyl ester and 0.2 g of dibutyl-tin dilaurate; the mixture is then kept at 40° C. until the NCO-content comes to 13.2% at a theoretical solids content of 90% by weight.

(b) Self-cross-linking resin

A quantity of 1498 g of a 75% solution of a polyglycidyl ether based upon bis-phenol A, having an epoxy-equivalent-weight of 458, is heated together with 62 g of versatic acid and 1.5 g of triphenylphosphine to about 155° C., under inert gas and with thorough stirring, to procure removal of water out of the system; this temperature is maintained until the acid number has become less than 0.1. Then the mixture is cooled to about 70° C., and 286 g of an adduct made from 1 mol of 1,6-diaminohexane and 2 mol of a glycidyl ester of versatic acid is added, whereupon the temperature rises to about 80° C. After 2 hours there is added 327 g of a 61.2% solution of diethylene triamine methyl isobutyl diketimine in methyl isobutyl ketone, and the mixture is held at 80° C. for a further two hour. Next, 323 g of a 90% solution of the above-described isocyanate-group-containing urethane ester is added and the reaction is allowed to proceed for two hour at 80° C. Following dilution with 500 g of monobutyl glycol ether, 450 g of solvents is distilled off under reduced pressure at 80° C.

Solids content: 76.5% by weight (heating to 180° C. for 40 minutes in the circulating-air cabinet).
Viscosity: 3.1 Pa s (after dilution of 50% by weight solids content with monobutyl glycol ether).
Amine number: 107 mg KOH/g of solid resin.

(c) Deposition bath

In 235 g of self-cross-linking resin there is dissolved, for the purpose of elastification, 20 g of polyaminoamide resin having an amine number of 90 and a viscosity of 0.86 Pa s (measured in a 50% by weight solution in monobutyl glycol ether); the mixture is neutralized with 5 g of acetic acid and is gradually diluted to a solids content of about 10% by weight with 1,740 g of deionized water. MEQ-acid is No. of milliequivalents of amine per 100 g of solid resin.

| pH value: | 7.2 |
|---|---|
| Specific electrical conductance of bath | 1 050 μS cm$^{-1}$ |
| 'MEQ'-value: | about 40 |

No precipitation phenomena or phase separations occur upon standing of the bath. The films are deposited on Bonder 127 during 2 minutes at a bath temperature of 30° C., are rinsed down with water, and baked in a circulating-air oven for 25 minutes at 180° C.

| Deposition voltage: | 160 V for a dry-film thickness of 13 μm |
|---|---|
| Pendulum hardness, according to Konig (DIN 53 157): | 202 second |
| Bending test: | satisfactory |
| Decomposition products: | 6.4% |

EXAMPLE 2

(a) Isocyanate-containing urethane ester

Into a solution of 630 g of trimethyl hexamethylene di-isocyanate in 113 g of dry methyl isobutyl ketone there is added, at about 40° C. during about 3 hours, 390 g of anhydrous lactic acid ethyl ester, whereupon the temperature rises slowly to 75° C. The temperature is then maintained at 70° to 75° C. until the NCO-content comes to 11.3% for a theoretical solids content of 90% by weight.

(b) Self-cross-linking resin

A quantity of 1350 g of a 75% solution of a bis-phenol A-based polyglycidyl ether, having an epoxy-equivalent-weight of 500, is heated together with 62 g of versatic acid, with 240 g of a 90% solution in methyl isobutyl ketone of a pre-condensate made from 2 mol of adipic acid and 1 mol of hydroxypivalic acid neopentyl glycol ester, and with 1.5 g of triphenyl phosphine, to about 155° C. under inert gas and with thorough stirring to eliminate water the latter temperature is maintained until the acid number has become less than 0.1. Then the mixture is cooled to 80° C., 336 g of a 59.6% solution of diethylene triamine methyl isobutyl diketimine in methyl isobutyl ketone is added, and the mixture is kept for 2 hours at 80° C. Next, 182.9 g of a 90% solution of the above-described isocyanate-group-containing urethane ester is added and the reaction is allowed to proceed for 2 hours at 80° C. Following dilution with 500 g of monobutyl glycol ether, 530 g of solvents is distilled off at 80° C. under reduced pressure.

| Solids content: | 78.6% by weight |
|---|---|
| Viscosity: | 0.96 Pa s |
| Amine number: | 75.4 mg KOH/g |

(c) Deposition bath

A quantity of 305 g of self-cross-linking resin is neutralized with 6 g of acetic acid and gradually diluted with 1,689 g of deionized water to a solids content of about 12% by weight.

| pH-value: | 7.65 |
|---|---|
| Specific electrical conductance of bath: | 1,424 μS cm$^{-1}$ |
| 'MEQ'-value: | about 40 |

No precipitation phenomena or phase separations occur during standing of the bath. The films are electrophoretically deposited of sheets of Bonder 127 during 2 minutes at a bath temperature of 30° C.; they are rinsed down with water and are baked for 25 minutes at 160° C. in a circulating-air oven.

| Deposition voltage: | 100 V for a dry-film thickness of 21 μm |
|---|---|
| Surface: | Smooth, flowing well |
| Pendulum hardness according to Konig: | 210 second |
| Salt-spray test according to DIN 50 021 | |

| | 240 h unbondered sheet | 360 h Bonder 127 |
|---|---|---|
| | (corrosion penetration/ | |
| Corrosion penetration | 1.5–2 mm | 1.5–2.5 mm |
| Surface corrosion | 2 | 0–1 |
| Bubbles (m/g) | 2/2–3 | 1-2/1–2 |
| Edge corrosion | 0 | ⅛ |

EXAMPLE 3

(a) OH-group-containing pre-polymer

Into 3,890 g of hydroxypivalic acid neopentyl glycol ester is sprinkled 2,109 g of iso-phthalic acid, at about 100° C.; polycondensation is then allowed to proceed at slowly rising temperatures of 180° to 250° C., with elimination of water of reaction, until an acid number of below 5 is attained. Dilution is carried out with dry ethyl acetate to attain a solids content of about 60% by weight.

| Hydroxyl number: | 84 mg KOH/g of solid resin |
|---|---|

(b) Isocyanate-group-containing urethane ester

A quantity of 1,787 g of the OH-group containing pre-polymer is mixed with 1,170 g of a biuret-group-containing aliphatic tri-isocyanate based upon hexamethylene di-isocyanate, with 236 g of dry lactic acid ethyl ester and with 9 g of anhydrous ethyl acetate; the mixture is stirred under nitrogen at a temperature of 80° C. until the NCO-content of 3.4% is measured.

(c) Self-cross-linking resin

Into a solution containing 451 g of a 75% by weight solution of methylaminopropylamine methyl isobutyl ketimine is methyl isobutyl ketone and 116 g of anhydrous ethyl acetate is added dropwise, during about 1.5 hours, 4,105 g of the isocyanate-group-containing urethane ester, the reaction temperature being maintained below 40° C. by cooling as necessary. Next the mixture is warmed to 80° C., and this temperature is maintained for two hours; thereafter hydrolysis is carried out by addition of 72 g of deionized water, and the solvent is distilled off in vacuo. Dilution is carried out with monobutyl glycol ether to a solids content of about 79% by weight

| Amine number | 45 mg KOH/g of solid resin |
|---|---|
| Viscosity | 2 Pa s (at 25° C., after dilution to 50% by weight-% of solids with monobutyl glycol ether) |

(d) Deposition bath 1

A quantity of 281 g of self-cross-linking resin is neutralized with 7.2 g of acetic acid and gradually diluted with 1,712 g deionized water to a solids content of about 10% by weight.

| pH value: | 7.1 |
|---|---|
| 'MEQ'-value: | about 60 |

No precipitation phenomena occur during standing of the bath. A film of 10 μm layer thickness is obtained at a deposition voltage of 75 V.

(e) Deposition bath 2

Into 239 g of self-cross-linking resin there is mixed, as an additional cross-linking agent, 43.5 g of a resin that is reactive toward amino groups the preparation of which will be described below; the mixture is neutralized with 7.2 g of acetic acid and gradually diluted with 1,710 g of deionized water to a solids content of about 10% by weight.

| pH value: | 6.6 |
|---|---|
| 'MEQ'-value: | about 60 |

No precipitation phenomena occur during standing of the bath. The films are deposited on Bonder 125 during two minutes at a bath temperature of 25° C., are rinsed down with water and are baked for 25 minutes at 160° C. in the circulating-air oven.

| Deposition voltage: | 150 V for a dry-film thickness of 20 μm |
|---|---|
| Pendulum hardness according to Konig (DIN 53 157): | 99 second |
| Erichsen cupping (DIN 53 156): | greater than 10 mm |

Preparation of the cross-linking agent

A quantity of 569.6 g of a biuret-group-containing aliphatic tri-isocyanate based upon hexamethylene diisocyanate is dissolved in 96 g of anhydrous ethyl glycol acetate and the solution is heated to 80° C. A quantity of 236 g of anhydrous lactic acid ethyl ester is added dropwise during 25 minutes; then the mixture is kept at 80° C. for 30 minutes, and next 59 g of methyl diethanolamine is added during 10 minutes. Decantation is carried out after 2 hours at 80° C.

| Solids: | about 90% by weight |
|---|---|
| Ester number (Calc.): | 130 mg KOH/g of solid resin |
| Amine number: | 32 mg KOH/g of solid resin |

(f) Deposition bath 3

Into 239 g of self-cross-linking resin is mixed 40 g of a 75% solution of a commercial etherified bis-phenol A-based phenolic resin in isopropanol; the mixture is neutralized with 4.8 g of acetic acid and gradually diluted with 1,716 g of deionized water to a solids content of about 10% by weight.

| pH-value: | 7.6 |
|---|---|
| 'MEQ'-value: | about 40 |

The films are electrophoretically deposited on Bonder 130 sheets during 2 minutes at a bath temperature of 25° C.; they are rinsed of with water and are baked for 25 minutes at 160° C. in the circulating-air oven.

| Deposition voltage: | 120 V for a dry-film thickness of 20 μm |
|---|---|
| Pendulum hardness according to Konig: | 160 second |
| Erichsen cupping: | greater than 10 mm. |

We claim:
1. A self-cross linking binding agent rendered water-dilutable by protonization with acids for a self-cross-linking, thermosetting aqueous lacquer coating medium, comprising
   (a) a synthetic resin with a mean molecular weight ($M_n$) of about 500 to 15,000 containing amino groups as well as carboxyl groups some of which are esterified with mono-alcohols containing from 1 to 6 carbon atoms,
   (b) said resin having an amine number of about 20 to 180 and an ester number of between 20 and 350,
   (c) the ester group being substantially stable in a neutral aqueous medium,
   (d) said ester groups being reactive with the primary and/or secondary amino groups of the synthetic resin in a basic medium at temperatures above about 140° C.
2. Binding agent according to claim 1, wherein said amino groups are primary amino groups.
3. Binding agent according to claim 1, wherein said amino groups are secondary amino groups.
4. Binding agent according to claim 2 or 3, characterized in that the ester groups are reactive toward the amino groups at temperatures above about 160° C.
5. Binding agent according to claim 2 or 3, characterized in that the equivalence ratio as between amino groups and esterified carboxyl groups lies within the range of 1:5 and 1:0.1.
6. Binding agent according to claim 1, characterized in that the mean molecular weight ($\overline{M}_n$) of the binding agent is between 800 and 10,000.
7. Binding agent according to claim 1, characterized in that the amine number of the binding agent is between 50 and 120.

8. Binding agent according to claim 1, characterized in that the ester number of the binding agent is between 60 and 120.

9. Binding agent according to claim 1, characterized in that the binding agent is a reaction product of
(a) epoxide-group-containing compounds having a mean molecular weight ($M_n$) of about 300 to 10,000 and an epoxy-equivalent weight of about 170 to 6,000 and/or isocyanate-group-containing compounds having at least two isocyanate groups with
(b) hydroxy or amino-group-containing aldimines or ketimines and with
(c) hydroxy and/or amino-alkyl esters or polyesters.

10. Binding agent according to claim 1, characterized in that at least 80% equivalent of the terminal carboxyl groups are esterified.

11. Binding agent according to claim 10, characterized in that substantially all of the terminal carboxyl groups are esterified.

12. Binding agent according to claim 1, characterized in that the terminal carboxyl groups are esterified with alcohols having a boiling point below 140° C.

13. Binding agent according to claim 12, characterized in that the terminal carboxyl groups are esterified with primary alcohols.

14. Binding agent according to claim 13, characterized in that the terminal carboxyl groups are esterified with lower aliphatic alcohols.

15. Binding agent according to claim 9, wherein said polyesters include acidic polycarboxylic acid esters.

* * * * *